United States Patent [19]
Samaras et al.

[11] Patent Number: 5,115,455
[45] Date of Patent: May 19, 1992

[54] METHOD AND APPARATUS FOR STABILIZED DATA TRANSMISSION

[75] Inventors: William A. Samaras, Haverhill; David T. Vaughan, Tyngsboro; Andrew D. Ingraham, Acton, all of Mass.

[73] Assignee: Digital Equipment Corporation, Maynard, Mass.

[21] Appl. No.: 546,400

[22] Filed: Jun. 29, 1990

[51] Int. Cl.⁵ .............................................. H04L 7/04
[52] U.S. Cl. .................................... 375/106; 375/111
[58] Field of Search ............... 375/106, 107, 111, 119, 375/38; 370/100.1, 105.2, 105.3; 371/1, 47.1; 307/269, 590, 591, 595, 596, 600, 601, 602

[56] References Cited

U.S. PATENT DOCUMENTS

| | | | |
|---|---|---|---|
| 3,622,885 | 11/1971 | Kruszynski et al. | 375/38 |
| 4,119,796 | 10/1978 | Jones | 375/111 |
| 4,404,680 | 9/1983 | Perkins | 375/111 |
| 4,430,745 | 2/1984 | Betts | 375/25 |
| 4,637,018 | 1/1987 | Flora et al. | 371/1 |
| 4,641,318 | 2/1987 | Addeo | 375/38 |
| 4,692,932 | 9/1987 | Denhez et al. | 375/107 |
| 4,700,347 | 10/1987 | Rettberg et al. | 371/1 |
| 4,714,924 | 12/1987 | Ketzler | 340/825.21 |
| 4,754,164 | 6/1988 | Flora et al. | 307/269 |
| 4,811,364 | 3/1989 | Sager et al. | 375/106 |
| 4,881,165 | 11/1989 | Sager et al. | 364/200 |
| 4,979,190 | 12/1990 | Sager et al. | 375/106 |

*Primary Examiner*—Benedict V. Safourek
*Attorney, Agent, or Firm*—Kenyon & Kenyon

[57] ABSTRACT

Data can be accurately transmitted between two subsystems in a synchronous system even if the clock skew or propagation delay between the two subsystems is greater than one clock cycle time. The source and destination subsystems are initialized to ensure synchronous operation. The source subsystem transmits data and a forwarded clock to the destination subsystem. The forwarded clock is passed through a delay device to introduce a one-half cycle delay into the forwarded clock timing. Data is captured in three state devices arranged in parallel to eliminate minimum delay requirements and to expand data valid time. The captured data is then aligned to the destination subsystem's clock by controlling a multiplexer which selects the proper signal at its input to pass to the input of a second state device coupled to its output. The data selected is then clocked into the second state device under the control of the distination subsystem's clock, thus aligning the received data with the destination subsystem's clock.

12 Claims, 6 Drawing Sheets

FIG. 4A
FORWARDED CLOCK TRANFER TIMING – EARLY CASE

FIG. 4B
FORWARDED CLOCK TRANFER TIMING - LATE CASE

METHOD AND APPARATUS FOR STABILIZED DATA TRANSMISSION

FIELD OF THE INVENTION

The invention relates to a digital computer system and, more particularly, to a synchronous digital computer system including two subsystems. The invention provides an efficient means to accurately transmit data between two synchronous subsystems even if the clock skew or propagation delay between the two subsystems is larger than one clock cycle.

BACKGROUND OF THE INVENTION

Previously designed methods for transferring data between two synchronous subsystems operating at low speeds have accurately transferred data. Such speed being relative to the state of the art. In low speed systems, the clock skew or propagation delay between subsystems is negligible since it is only a portion of the entire cycle time. Thus, data transmitted from a first subsystem was stable long enough to allow a skewed clock to capture the data in a state device in the second subsystem while meeting the setup and hold time requirements of a state device in the second subsystem.

Interfacing between subsystems becomes more critical as the operating rates of the subsystems are increased. The operating rate of the subsystems is the rate at which the subsystems transmit and receive data. When such rates are high, there is frequently a problem ensuring that accurate data transmission will occur between subsystems. This problem occurs because data from a source subsystem is not stable long enough to meet the setup and hold time requirements of a destination subsystem's state device. By conventional means, data transmitted from the first subsystem would be stable for at most one clock cycle time. If the clock skew or the propagation delay between two subsystems is greater than this time, it is difficult to guarantee that the destination subsystem will capture the correct data.

One solution to the foregoing data transmission problem is proposed in U.S. Pat. No. 4,811,364 entitled "Method and Apparatus for Stabilized Data Transmission". In one of the preferred embodiments, a clock is forwarded from the source subsystem to the destination subsystem along with the data. The destination subsystem uses the trailing edge of the forwarded clock signal to capture data in its state device. This guarantees that accurate data will be transmitted between two synchronous subsystems.

The one drawback to the foregoing solution is that by utilizing the trailing edge of the forwarded clock to capture data in the destination subsystem's state device, the system becomes sensitive to the pulse width of the clocks. In high speed digital systems, it is difficult to guarantee that the clocks will maintain an even 50%-50% duty cycle. A 50%-50% duty cycle implies that each period of the clock signal will be divided into two equal subperiods, where for one subperiod the clock signal is high and for the other subperiod the clock signal is low. Thus, as clocks are propagated through a system, the pulse widths of such clocks may stretch or shrink. Also, the foregoing solution does not address the problem of transmitting accurate data between two subsystems when propagation delays between the two subsystems exceed the clock cycle times of the subsystems.

While the prior art provides adequate means for transmitting data between two subsystems, there is a need for advancement. In particular, in a high performance synchronous computer system, ensuring accurate data transmission between two subsystems is becoming more difficult as operating rates are increasing. With increased rates of operation, it is imperative to ensure data stability across subsystem boundaries to meet the setup and hold time requirements of a state device in a destination subsystem.

SUMMARY OF THE INVENTION

Accordingly, the present invention ensures that data transmitted in a synchronous system from a source subsystem remains stable at the input of a state device in a destination subsystem long enough to meet the setup and hold time requirements of the state device even if the clock skew plus the propagation delays between the source and destination subsystems exceed the clock cycle time of the subsystems.

Generally, the present invention comprises a source subsystem and a destination subsystem. The source subsystem comprises a state device, a driver and a differential driver. The destination subsystem comprises a driver, a differential driver, three state devices arranged in parallel, a multiplexer, a data receiving state device, a forwarded clock phase generator and data mux select logic. The source and destination subsystems are coupled by a data path and a forwarded clock path. Both paths have inherent unknown delays. Similarly, the system clock that drives both subsystems is subject to unknown delays. Therefore, the system clock in the destination subsystem is skewed with respect to the version of the system clock in the source subsystem. An additional delay device is intercoupled in the forwarded clock path between the source subsystem and the destination subsystem.

The invention ensures accurate data transmission between the source and destination subsystems by requiring that the source subsystem forward a clock, via the differential driver, with the data to the destination subsystem. The forwarded clock is transmitted from the differential driver through the delay device which shifts the forwarded clock by a portion, e.g., one-half, clock cycle time. This delay is introduced to guarantee that the leading edge of the forwarded clock will be received by the destination subsystem when received data is stable.

The data is captured in the destination subsystem in the three parallel state devices. Utilizing three state devices eliminates minimum delay requirements for satisfying data segment timing. This system allows for full bandwidth data transfers with two cycles of latency. Full bandwidth data transfers means that new data can be transferred between subsystems every system clock cycle time.

The parallel state devices are controlled by the forwarded clock phase generator which performs as a clock phase generator. The forwarded clock phase generator produces three output signals which are coupled respectively to a clock input of the parallel state devices. The data rate of the output signals generated by the forwarded clock phase generator is one third of the frequency of the forwarded clock. The transmitted data is sequentially captured in the parallel state devices by the forwarded clock phase generator output signals.

The outputs of the parallel state devices are coupled to the inputs of the multiplexer. The multiplexer is coupled to the data receiving state device which is controlled by the clock of the destination subsystem. Under the control of the control signals generated by the data mux select logic, the data passed by the parallel state devices is selected to pass through the multiplexer to the input of the data receiving state device. Through this selection process, stable data appears at the input of the data receiving state device, thus providing a large data valid window and satisfying the setup and hold time requirements of the data receiving state device. The received data when captured in the data receiving state device by the destination subsystem's clock is thus aligned to the system clock in the destination subsystem.

DETAILED DESCRIPTION

Figure 1:
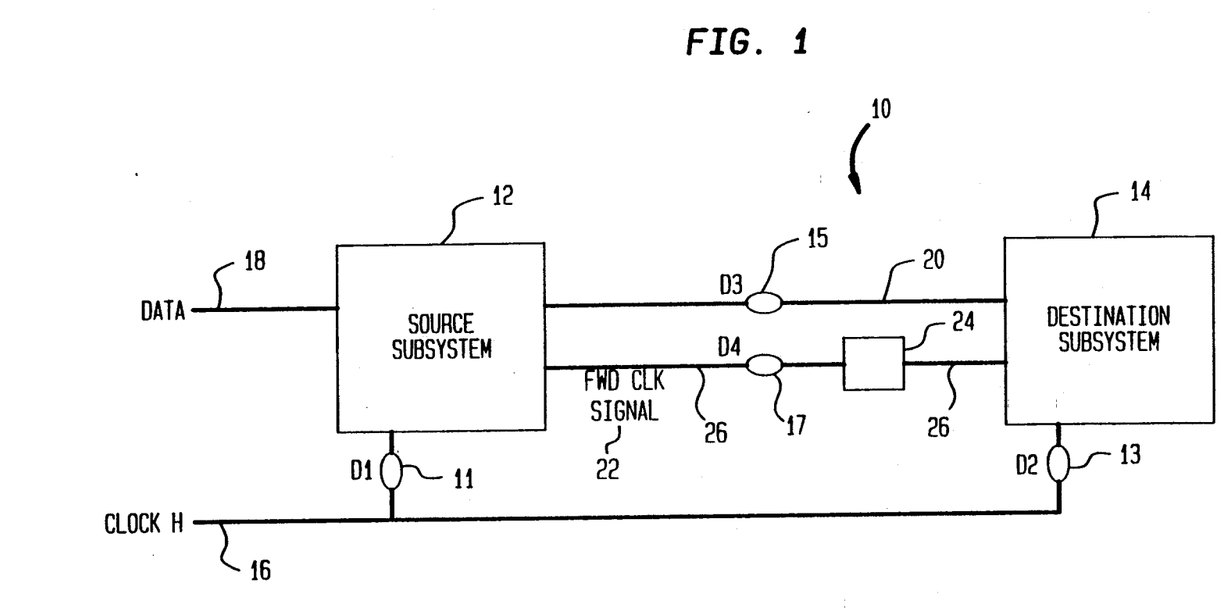
FIG. 1 is a block diagram of the system of the present invention.

Referring now to the drawings, and initially to FIG. 1, there is illustrated in block diagram form, the system 10 of the present invention. System 10 comprises a source subsystem 12 and a destination subsystem 14. Both subsystem 12 and 14 operate under the same system clock 16, therefore, this arrangement is a fully synchronous system. However, due to unknown inherent delays in the system, each subsystem clock is a delayed ("skewed") version of the system clock 16. Specifically, the system clock 16 in the source subsystem 12 is delayed by unknown delay of D1 11 and the system clock 16 in the destination subsystem 14 is delayed by unknown delay of D2 13. The source subsystem 12 transmits the data 18 via the data path 20 through an unknown delay D3 15 and a forwarded clock signal 22 through a delay device 24 and an unknown delay D4 17 via forwarded clock path 26 to the destination subsystem 14. The delay device 24 provides for a portion, e.g., one-half, clock cycle time delay in the forwarded clock signal as will be described below.

Independent of the delay device 24, the forwarded clock path 26 and the data path 20 are arranged to have similar delays to insure proper operation. Thus, it is important that the delays D3 15 and D4 17 are arranged to be nearly identical. Correlation of the data path 20 and clock path 26 insures that the relative timing of signals transmitted across the data path 20 and the clock path 26 is maintained.

Between the source subsystem 12 and the destination subsystem 14, there is a large, uncertain delay inherent in both the data 18 transferred and the system clock 16. To overcome this inherent delay, the forwarded clock signal 22 is sent from the source subsystem 12 to the destination subsystem 14 to capture the data 18 transmitted from the source subsystem 12. The data 18 and the forwarded clock signal 22 are transmitted every cycle. The forwarded clock signal 22, however, is delayed in the delay device 24 by a portion, e.g., one-half, clock cycle time. Thus, the leading edge of the forwarded clock signal 22 is arranged to occur optimally in the middle of the data stable time of the data.

Figure 2:
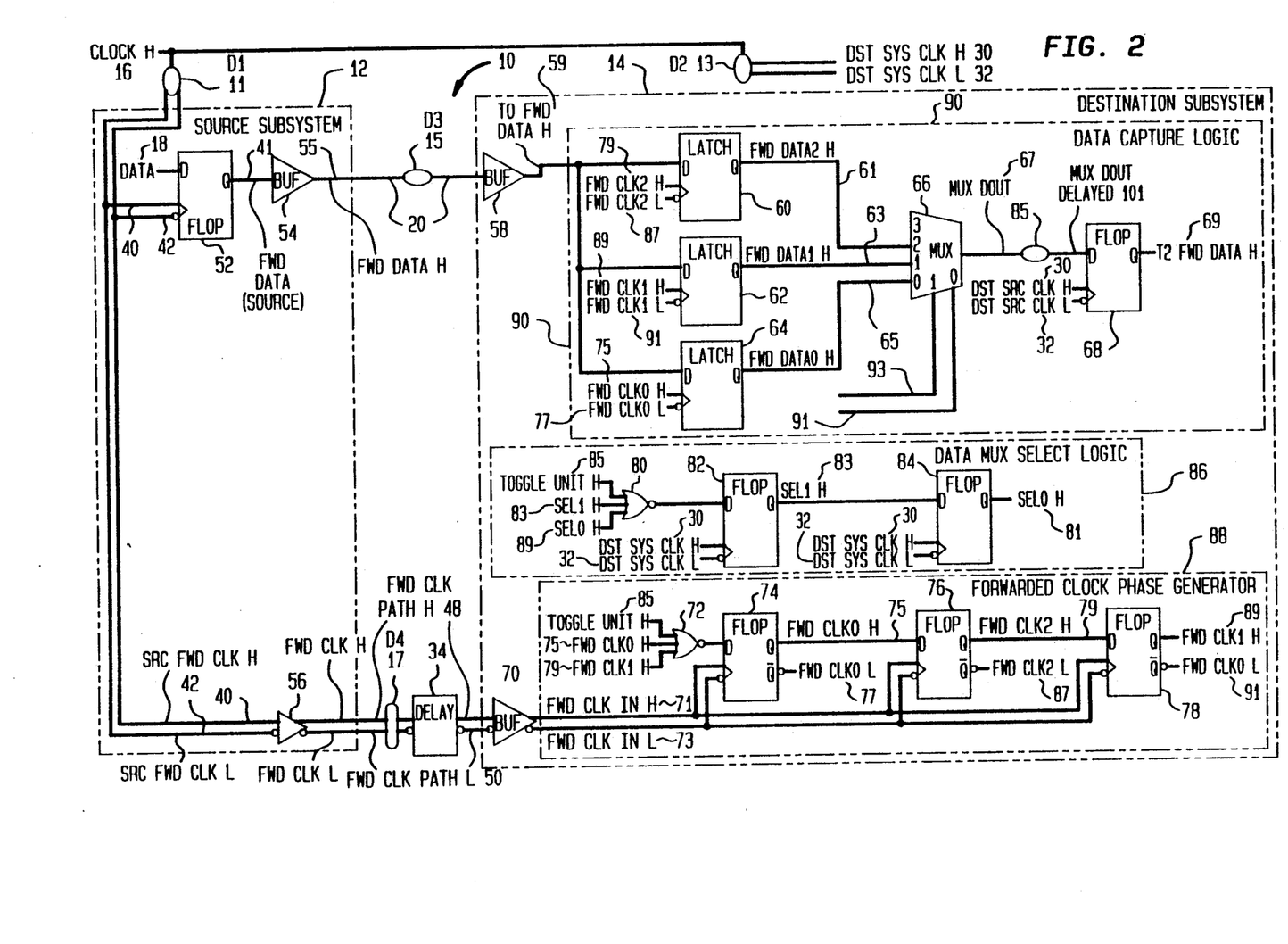
FIG. 2 is a more detailed block diagram of the system of the present invention.

Referring now to FIG. 2, there is illustrated in a more detailed block diagram, the system of the present invention. The basic components described above for FIG. 1, the source subsystem 12, the destination subsystem 14, the data 18, the data path 20, the delay device 24, and the unknown delays D1 11, D2 13, D3 15 and D4 17 are included again here with the same numeric designation. The system clock 16 of FIG. 1 is shown in FIG. 2 passing through unknown delays D1 11 for the source subsystem 12 and D2 13 for the destination subsystem 14. After passing through the delays, the system clock 16 is then represented by differential clock signals SRC SYS CLK H 40, SRC SYS CLK L 42, DST SYS CLK H 30 and DST SYS CLK L 32. Similarly, the forwarded clock signal 22 of FIG. 1 is represented in FIG. 2 by FWD CLK H 44 and FWD CLK L 46. Forwarded clock signal path 26 of FIG. 1 is divided into two segments FWD CLK PATH H 48 and FWD CLK PATH L 50 in FIG. 2. Clock signals are distributed utilizing differential techniques to maintain signal integrity.

The source subsystem 12 comprises a register flip flop state device 52, a driver 54 and a differential driver 56. The data 18 is coupled to a data input of the state device 52. SRC SYS CLK H 40 and SRC SYS CLK L 42 are coupled to clock inputs of the state device 52. A data output of the state device 52 is coupled to and provides FWD DATA (SOURCE) 41 as an input to the driver 54. An output of the driver 54 is coupled to the destination subsystem 14 via the data path 20. It is across this path that the transmitted data, FWD DATA H 55, is transmitted through the unknown delay D3 15 to the destination subsystem 14. SRC SYS CLK H 40 and SRC SYS CLK L 42 are coupled to inputs of the differential driver 56. Outputs of the differential driver 56 are coupled through the unknown delay D4 17 to the delay device 24. It is through this path that the forwarded clocks, referred to as FWD CLK H 44 and FWD CLK L 46 in FIG. 2, are forwarded to the destination subsystem 14.

The destination subsystem 14 comprises a driver 58, a differential driver 70, data capture logic 90, data mux select logic 86 and a forwarded clock phase generator 88. An input of the driver 58 is coupled to the source subsystem 12 via the data path 20. An output of the driver 58 is coupled to an input of the data capture logic 90. It is through this path that the transmitted data, TO FWD DATA H 59, is received by the destination subsystem 14. The data capture logic 90 is the portion of the logic of the destination subsystem 14 that aligns the data transmitted from the source subsystem 12 to the destination subsystem 14 and generates data valid time extensions.

Inputs of the differential driver 70 are coupled to outputs of the delay device 24 via FWD CLK PATH H 48 and FWD CLK PATH L 50. Outputs of the differential driver 70 are coupled to inputs of the forwarded clock phase generator 88. It is through this path that the forwarded clock signals transmitted from the source subsystem 12, FWD CLK IN H 71 and FWD CLK IN L 73, are received by the destination subsystem 14. The forwarded clock phase generator 88 provides three phase clock signals to the data capture logic 90. Outputs of the data mux select logic 86 are coupled to the data capture logic 90 to provide selection signals, SEL0 H 81 and SEL1 H 83, as will be discussed below in further detail.

The data capture logic 90 comprises three flow-through latches 60, 62, and 64 arranged in parallel, a multiplexer 66 and a data receiving register flip flop state device 68. Data inputs of the latches 60, 62 and 64 are coupled to the output of the driver 58 to receive TO FWD DATA H 59 data signal. Clock inputs of the latches 60, 62 and 64 are coupled to outputs of the forwarded clock phase generator 88 as will be described in detail below. Outputs of the latches 60, 62 and 64 are coupled to inputs of the multiplexer 66. The outputs of the latches 60, 62 and 64 carry the received data, TO FWD DATA H 59, to the inputs of the multiplexer 66 as FWD DATA2 H 61, FWD DATA1 H 63 and FWD DATA0 H 65. The multiplexer 66 has its output coupled through an unknown delay of D5 19 to the input of the data receiving state device 68 to carry the selected data from the input of the multiplexer 66 to the data receiving register flip flop state device 68. The output signal of the multiplexer 66 is denoted as MUX DOUT 67. The signal MUX DOUT 67 after passing through D5 19 is referred to as MUX DOUT (DELAYED) 101. The selection of the inputs of the multiplexer 66 is controlled by signals output by the data mux select logic 86 which are coupled to selection inputs of the multiplexer 66 as will be described below. Clock inputs of the data receiving register flip flop state device 68 are coupled to DST SYS CLK H 30 and DST SYS CLK L 32. An output of the data receiving register flip flop state device 68 is coupled to the rest of the destination subsystem 14 which is not shown and carries the received data aligned to the destination subsystem's clock as T2 FWD DATA H 69.

The data mux select logic 86 comprises a three-input NOR gate 80 and two register flip flop state devices 82 and 84. DST SYS CLK H 30 and DST SYS CLK L 32 are coupled to clock inputs of the flip flops 82 and 84. An output of the flip flop 82 which carries SEL1 H 83 signal is coupled to an input of the NOR gate 80, the flip flop 84 and a select input of the multiplexer 66. Similarly, an output of the flip flop 84 which carries SEL0 H 81 is coupled to an input of the NOR gate 80 and a select input of the multiplexer 66. An output of the NOR gate 80 is coupled to an input of the flip flop 82. A system wide signal TOGGLE INIT H 85 is coupled to an input of the NOR gate 80. This signal controls the initialization sequence of the present invention as will be described below.

The forwarded clock phase generator 88 comprises a three-input NOR gate 72 and three register flip flop state devices 74, 76 and 78. The outputs of the differential driver 70 are coupled to clock inputs of the flip flops 74, 76 and 78 to provide the flip flops 74, 76 and 78 with FWD CLK IN H 71 and FWD CLK IN L 73. The Q output of the flip flop 74 which carries FWD CLK0 H 75 signal is coupled to an input of the NOR gate 72, the D input of the flip flop 76 and a clock input of the latch 64 in the data capture logic 90. The Q\ output of the flip flop 74 which carries FWD C 77 signal is also coupled to a clock input of the latch 64. The Q output of the flip flop 76 which carries FWD CLK2 H 79 signal is coupled to an input of the NOR gate 72, the D input of the flip flop 78 and a clock input of the latch 60 in the data capture logic 90. The Q\ output of the flip flop 76 which carries FWD CLK2 L 87 signal is also coupled to a clock input of the latch 60. The Q output of the flip flop 78 which carries FWD CLK1 H 89 signal is coupled to a clock input of the latch 62 in the data capture logic 90. The Q\ output of the flip flop 78 which carries FWD CLK1 L 91 signal is also coupled to a clock input of the latch 62. The system level signal TOGGLE INIT H 85 is coupled to an input of the NOR gate 72. An output of the NOR gate 72 is coupled to the D input of the flip flop 74.

In operation, the source subsystem 12 transmits FWD DATA H 55 and the full bandwidth forwarded clock signals, FWD CLK H 44 and FWD CLK L 46, to the destination subsystem 14. The forwarded clock signals are received by the differential driver 70 and propagated to the forwarded clock phase generator 88. The state devices 74, 76 and 78 which comprise the forwarded clock phase generator 88, derive three distinct signal pairs, FWD CLK0 H 75, FWD CLK0 L 77, FWD CLK1 H 89, FWD CLK1 L 91, FWD CLK2 H 79 and FWD CLK2 L 87, from the forwarded clock signal FWD CLK IN H 71. The frequency of each of these signals pairs is one third that of FWD CLK IN H 71, thus providing three separate three-phase clock signals. It is these signals that sequentially select the transmitted data, TO FWD DATA H 59, to pass through the latches 60, 62 and 64. Through the use of the three-phase clock signals, the present invention provides a large window in which the received data will be valid at the inputs of the multiplexer 66.

The control of the multiplexer 66 is accomplished by the data mux select logic 86. The outputs of the register flip flop state devices 82 and 84, SEL1 H 83 and SEL0 H 81, are derived from DST SYS CLK H 30 and DST SYS CLK L 32. Thus, the selection of the inputs of the multiplexer 66 is synchronized to the system clocks of the destination subsystem 14. Through this synchronization, the proper output of the latches 60, 62 and 64 are selected to p=ss through the multiplexer 66 to the input of the data receiving register flip flop state device 68 at the proper time. This ensures that the setup and hold time of the data receiving register flip flop state device 68 is satisfied and the data that was transmitted by the source subsystem 12 is received by the destination subsystem 14.

Data can be transmitted from the source subsystem 12 and received by the destination subsystem 14 every cycle. There will be, however, a two cycle latency before such transmitted data is received by the destination subsystem 14.

To insure proper operation of the system of the present invention illustrated in FIG. 2, a proper initialization sequence must be followed. This will insure that accurate data is captured by the data capture logic 90.

Figure 3:
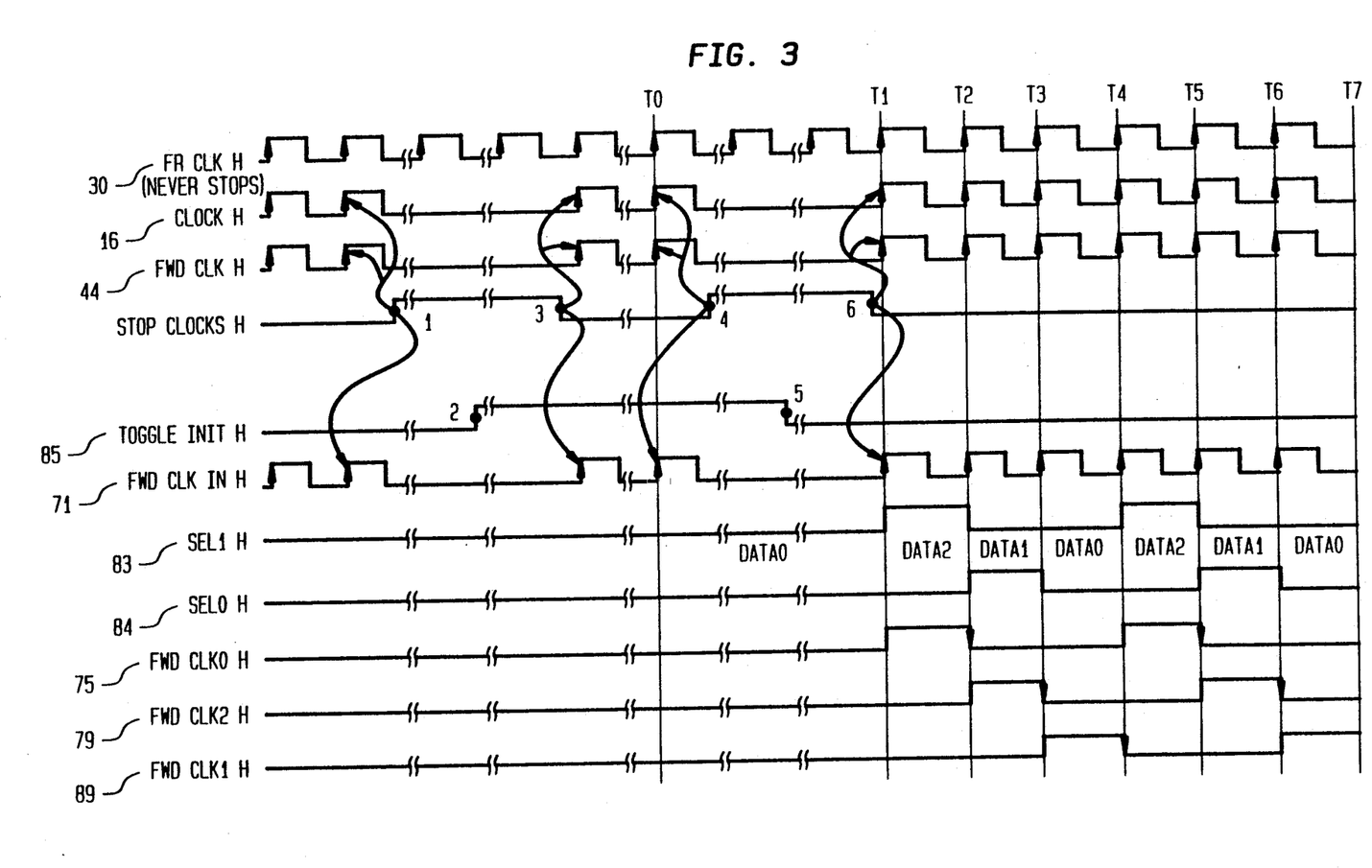
FIG. 3 is a timing diagram which illustrates the timing of the initialization sequence of the system of the present invention.

FIG. 3 is a timing diagram which illustrates the initialization sequence. The initialization sequence commences upon the assertion of a STOP CLOCKS H signal at point 1 in FIG. 3. The assertion of this signal will stop the system clocks, i.e., clock H 16, SRC SYS CLK H 40 and SRC SYS CLK L 42. The clock signal FR CLK H is not stopped because this signal provides the fundamental timing to the system. At point 2, which is, e.g., 16 cycles later, TOGGLE INIT H 85 is asserted. This signal is used to preset the circuitry in the present invention. It is essential that the data mux select logic 86 and the forwarded clock phase generator 88 latch this signal simultaneously to insure that they are synchronized.

STOP CLOCKS H signal is deasserted at point 3 which is, e.g., 16 cycles, after TOGGLE INIT H 85 is asserted. This causes the system clocks to start running again. After at least three clock cycles, point 4, the STOP CLOCKS H signal is reasserted and the system clocks are stopped. The TOGGLE INIT H 85 signal is deasserted at point 5 which is, e.g., 16 cycles after the STOP CLOCKS H signal is reasserted. Finally, the STOP CLOCKS H signal is deasserted, e.g., 16 cycles after the TOGGLE INIT H 85 signal is deasserted, at point 6 which allows all system clocks to start running again. The initialization phase is now complete.

Figure 4A:
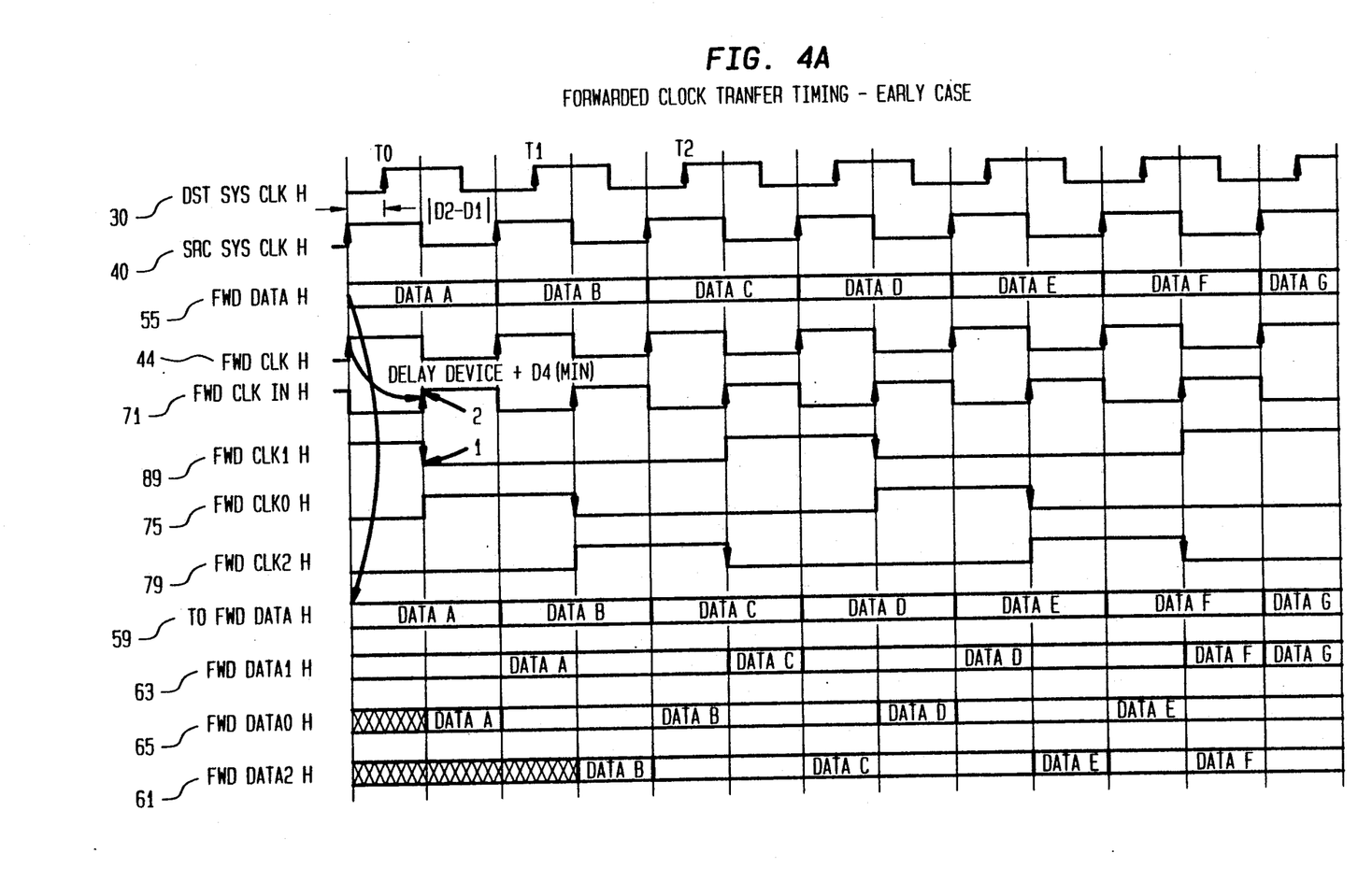
FIGS. 4A–4C are timing diagrams which illustrate the timing of a data transfer in the system of the present invention.
Figure 4B:
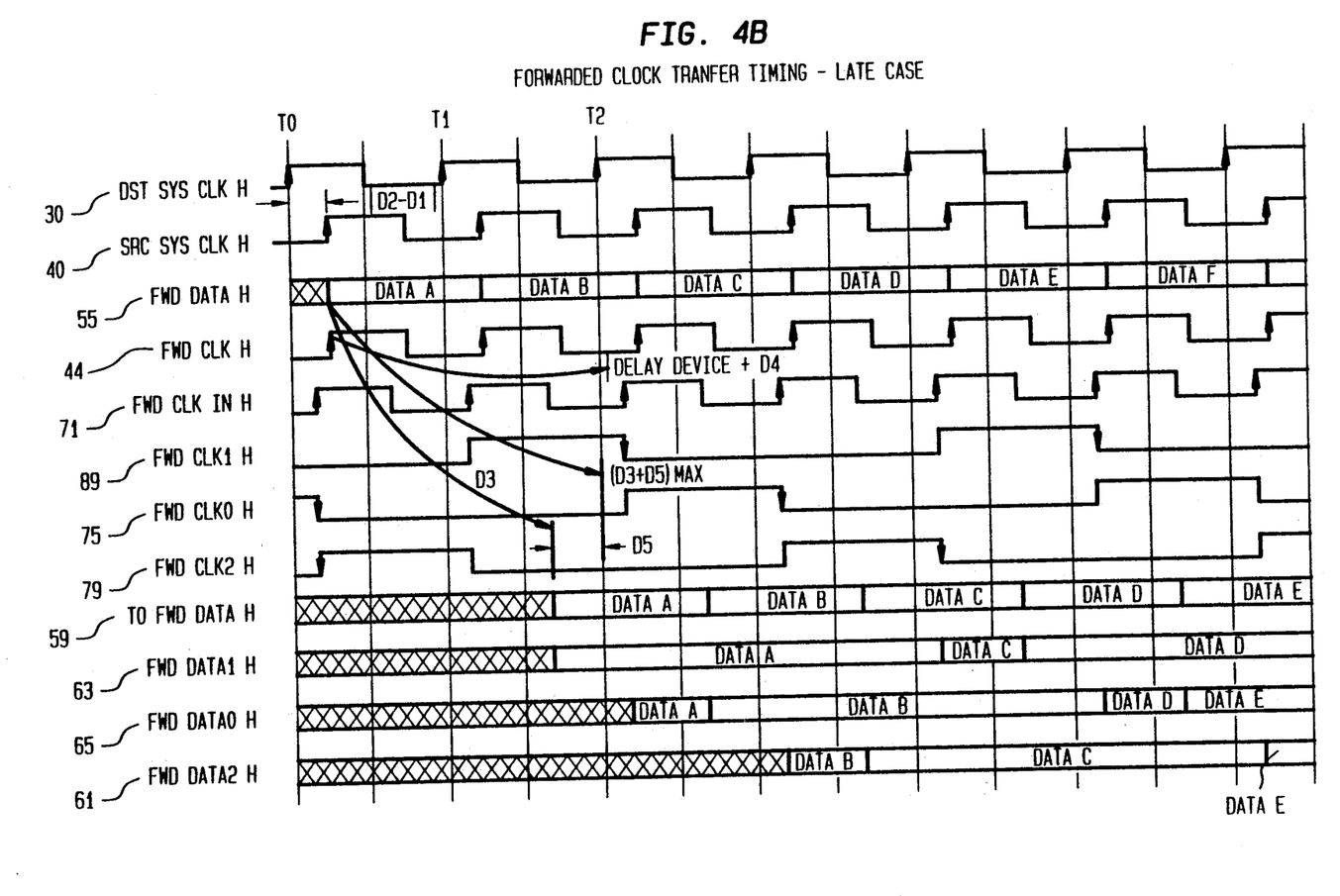
Figure 4C:
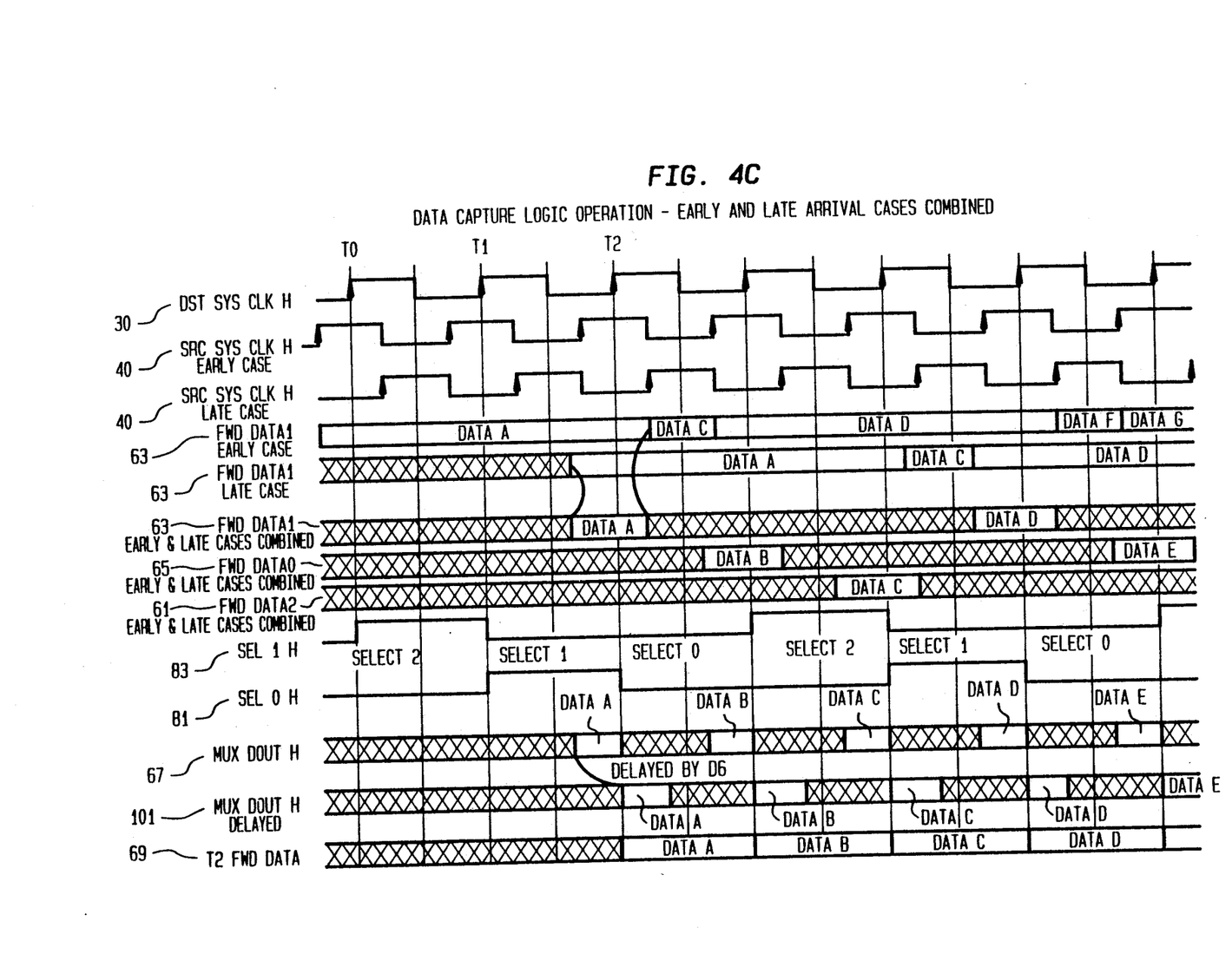

Reference is now made to FIGS. 4A-4C for a description of how the present invention provides for the transfer of data from the source subsystem 12 to the destination subsystem 14. The signal names set forth on the left-hand side of FIGS. 4A-4C represent the signals listed in FIG. 2.

FIGS. 4A-4C describe the operation of system 10 in FIG. 2 by illustrating an early case, a late case, and an early and late case combined. The early and late cases represent the earliest or latest times that the FWD DATA H 55 transmitted from the source subsystem 12 could arrive at the destination subsystem 14. Early and late signals occur due to physical variations which induce delays. All physical variations are represented by D1 11, D2 13, D3 15, D4 17 and D5 19.

Reference is now made to FIG. 4A to describe the operation of the system of the present invention when the unknown delays D3 15 and D4 17 are zero. The signal DST SYS CLK H 30 represents the system clock signal in the destination subsystem 14. This signal provides the reference from which any skew in signals in system 10 in FIG. 2 is measured. The signal SRC SYS CLK H 40 represents the system clock signal in the source subsystem 12. The skew between SRC SYS CLK H 40 and DST SYS CLK H 30 is shown in FIG. 4A as the absolute magnitude of the difference between the unknown delays D1 11 and D2 13.

The next timing signal, FWD DATA H 55 represents the data output from the driver 54. Note that for this example, data changes every cycle. The FWD CLK H 44 signal represents the output of the differential driver 56. The FWD CLK H 44 signal is also subject to the unknown delay D4 17. This signal is passed through the delay device 24 where it is delayed by one-half clock (clock H 16) cycle. The resulting signal is output by the delay device 24, received by the differential driver 70 and output to the forwarded clock phase generator 88 as FWD CLK IN H 71.

The first leading edge of FWD CLK IN H 71 clocks the state devices 74, 76 and 78. The resulting signals output by these state devices are represented by FWD CLK0 H 75, FWD CLK1 H 89 and FWD CLK2 H 79. The initial leading edge of FWD CLK IN H 71, point 2 in FIG. 4A, causes FWD CLK0 H 75 to be asserted, FWD CLK1 H 89 to be deasserted and FWD CLK2 H 79 to remain unchanged.

While forwarded clock phase generator 88 is being toggled, FWD DATA H 55 is received by the driver 58 and presented to the inputs of the latches 60, 62 and 64 in the data capture logic 90 as T0 FWD DATA H 59. The relationship of FWD DATA H 55 and T0 FWD DATA H 59 is indicated in FIG. 4A to show that T0 FWD DATA H 59 is the delayed version of FWD DATA H 55 which is delayed by the unknown delay D3 15. Since for this example, D3 is zero, the timing of FWD DATA H 55 and T0 FWD DATA H 59 is identical.

T0 FWD DATA H 59 passes through the latches 60, 62 and 64 until it is captured by one of the latches 60, 62 and 64 when the latches' respective clocking signals are deasserted. This data will remain stored in one of the latches 60, 62 and 64 until its respective clocking signal is asserted at which time the new data will be passed.

For example, the data item transmitted in FWD DATA H 55 referred to in FIG. 4A as DATA A, is passed and then captured by the latch 62 when FWD CLK1 H 89 is deasserted at point 1 on FIG. 4A. This causes the output of the latch 62, FWD DATA1 H 63, to continue to present the data item DATA A to an input of the multiplexer 66 while the latches 60 and 64 continue to pass the data presented to their inputs. The latches 60 and 64 have analogous operation.

Reference is now made to FIG. 4B to describe the operation of the system of the present invention under maximum delays where the combination of the unknown delays D3 15 and D5 19 is at its maximum value and D3 15 equals D4 17. Each signal that is affected by the unknown delays is shown with its maximum delay value. For example, the skew between DST SYS CLK H 30 and SRC SYS CLK H 40 is again shown as the absolute magnitude of the difference between the unknown delays D1 11 and D2 13. Similarly, the relationship between FWD CLK H 44 and FWD CLK IN H 71 is shown indicating the maximum value for the delay D4 17 combined with the one-half cycle delay introduced into the forwarded clock signal by the delay device 24.

FWD DATA H 55 is received by the driver 58 and presented to the inputs of the latches 60, 62 and 64 in the data capture logic 90 as T0 FWD DATA H 59. The relationship of FWD DATA H 55 and T0 FWD DATA H 59 is indicated in FIG. 4B to show that T0 FWD DATA H 59 is the delayed version of FWD DATA H 55, which is subject to the maximum value of delay D3 15.

As shown in FIG. 4B, T0 FWD DATA H 59 passes through the latches 60, 62 and 64 until it is captured by one of the latches 60, 62 and 64 when the latches' respective clocking signals are deasserted. This data will remain stored in one of the latches 60, 62 and 64 until its respective clocking signal is asserted at which time the new data will be passed as was described above for FIG. 4A.

FIGS. 4A-4B illustrate the process by which the present invention captures data in the latches 60, 62 and 64 with minimum and maximum delays. FIG. 4C illustrates the operation of the data mux select logic 86 and the data capture logic 90 of FIG. 2 to transfer the captured data from the outputs of the latches 60, 62 and 64 to the output of the data receiving register flip flop state device 68 thereby aligning the data received from the source subsystem 12 to the clock, i.e., DST SYS CLK H 30, of the destination subsystem Both the early and late versions of SRC SYS CLK H 40 and FWD DATA1 H 63 are illustrated in FIG. 4C. The next group of signals represents combined versions of FWD DATA0 H 65, FWD DATA1 H 63 and FWD DATA2 H 61 illustrated in FIG. 4A-4B. The signals are combined to illustrate the data valid window that is available for data to be captured in the data receiving register flip flop state device 68. For the sake of clarity, only the early and late versions of FWD DATA1 H 63 were included to illustrate the data valid window. It is to be understood that the same procedure is performed to determine the data valid window for the combined early and late versions of FWD DATA0 H 65 and FWD DATA2 H 61.

The data item DATA A is transferred from the output of latch 62 to the output of data receiving register flip flop state device 68 through the following sequence of events. As discussed above, the data mux select logic 86 is initialized to operate synchronously with the forwarded clock phase generator 88. Thus, while the data items and the forwarded clock are being passed to the destination subsystem 14, the outputs of the data mux select logic 86, SEL1 H 83 and SEL0 H 81, are toggling. As indicated in FIG. 4C, when SEL1 H 83 is low and SEL0 H 81 is high, FWD DATA1 H 63 passes through the multiplexer 66. Similarly, when SEL1 H 83 is low and SEL0 H 81 is low, FWD DATA0 H 65 passes through the multiplexer 66, and when SEL1 H 83 is high and SEL0 H 81 is low, FWD DATA2 H 61 passes through the multiplexer 66. Thus, when data item DATA A is output by the latch 62 as FWD DATA1 H 63 signal, SEL1 H 83 is low and SEL0 H 81 is high. Therefore, DATA A is selected to pass to the output of the multiplexer 66. The signal output by the multiplexer 66 is represented by MUX DOUT 67. The next leading edge of DST SYS CLK H 30 clocks MUX DOUT 67, which contains data item DATA A, into the data receiving register flip flop state device 68. The output of the data receiving register flip flop state device 68 represented by T2 FWD DATA H 69 now comprises the data item, DATA A. Thus, data item DATA A has accurately been transferred from the source subsystem 12 to the destination subsystem 14 in two clock cycle times.

The transfer of other data items, e.g., DATA B, DATA C and DATA D, is also illustrated in FIGS. 4A-4C. The same principles discussed above in propagating DATA A from the source subsystem 12 to the destination subsystem 14 applies for these data items. The only difference lies in which one of the latches 60, 62 or 64 in the data capture logic 90 passes the data item to the input of the multiplexer 66.

The foregoing description of the present invention described the transmission of data from the source subsystem 12 to the destination subsystem 14 one data item at a time. The present invention is not limited to only transferring one data item at a time, but can be expanded to transmit N data bits in parallel. The only modification to the system illustrated in FIG. 2 to implement an N-bit wide data transfer would be to duplicate the data capture logic 90, the register flip flop state device 52, driver 54 and the buffer 58 for each parallel data item transmitted. The absolute limit that the system of the present invention can be expanded to is limited by the technology employed to fabricate such system. A 64-bit wide data path is feasible with the current state of the art.

What is claimed is:
1. A digital system which comprises:
a first subsystem;
a clock signal having a cycle time coupled by a clock path to the first subsystem;
a second subsystem comprising:
a plurality of latches arranged in parallel, each latch having a data input, control inputs and a data output,
a multiplexer having a plurality of data inputs, each one coupled to the data output of one of the plurality of latches, control inputs, and an output,
a state device having a data input coupled to the output of the multiplexer and a data output, and
control logic having inputs and control outputs, each one of the outputs coupled to a preselected respective one of the control inputs of the plurality of latches and multiplexer,
the second subsystem coupled to the clock signal;
a data path coupling the first subsystem to the second subsystem for transmitting a series of data items from the first subsystem to the second subsystem;
a forwarded clock path coupling the first subsystem to the second subsystem for transmitting a forwarded clock signal from the first subsystem to the second subsystem;
a delay device intercoupled in the forwarded clock path between the first subsystem and the second subsystem, the delay device delaying the forwarded clock signal for a portion of the clock cycle time;
the control logic generating a plurality of control signals in response to the delayed forwarded clock signal;
the inputs of the plurality of latches coupled to the data path, the plurality of latches being sequentially enabled by the plurality of control signals from the control logic to capture the series of data items in the plurality of latches;
the multiplexer sequentially selects its inputs to pass the series of data items available at the outputs of the plurality of latches to the multiplexer output under the control of the plurality of control signals from the control logic; and
the state device captures the data items from the output of the multiplexer under the control of the clock signal.

2. The digital system of claim 1 wherein the portion of the clock cycle time the delay device delays the forwarded clock signal is one-half clock cycle time.

3. The digital system of claim 2 wherein the control logic comprises:
a forwarded clock phase generator having inputs and control outputs, each one of the outputs coupled to a preselected respective one of the control inputs of the plurality of latches, the forwarded clock phase generator generating a plurality of control signals in response to the delayed forwarded clock signal to sequentially enable the plurality of latches to capture the series of data items; and
data mux select logic having inputs and control outputs, each one of the outputs coupled to a preselected respective one of the control inputs of the multiplexer, the data mux select logic generating a plurality of selection control signals in response to the delayed version of the clock signal to sequentially select the inputs of the multiplexer to pass the series of data items to the output of the multiplexer.

4. A digital system which comprises:
a first subsystem;
a clock signal having a cycle time coupled by a clock path to the first subsystem;
a second subsystem comprising:
a plurality of latches arranged in parallel, each latch having a data input, control inputs and a data output,
a multiplexer having a plurality of data inputs, each one coupled to the data output of one of the plurality of latches, control inputs, and an output,
a state device having a data input coupled to the output of the multiplexer and a data output,
a forwarded clock phase generator having inputs and control outputs, each one of the outputs coupled to a preselected respective one of the control inputs of the plurality of latches, and data mux select logic having inputs and control outputs, each one of the outputs coupled to a preselected respective one of the control inputs of the multiplexer, the second subsystem coupled to the clock signal;

a data path coupling the first subsystem to the second subsystem for transmitting a series of data items from the first subsystem to the second subsystem;

a forwarded clock path coupling the first subsystem to the second subsystem for transmitting a forwarded clock signal from the first subsystem to the second subsystem;

a delay device intercoupled in the forwarded clock path between the first subsystem and the second subsystem, the delay device delaying the forwarded clock signal by a portion of the clock cycle time;

the forwarded clock phase generator generating a plurality of control signals in response to the delayed forwarded clock signal;

the data mux select logic generating a plurality of selection control signals in response to the clock signal;

the inputs of the plurality of latches coupled to the data path, the plurality of latches being sequentially enabled by the plurality of control signals from the forwarded clock phase generator to capture the series of data items in the plurality of latches;

the multiplexer sequentially selects its inputs to pass the series of data items available at the outputs of the plurality of latches to the multiplexer output under the control of the plurality of selection control signals from the data mux select logic; and the state device captures the data items from the output of the multiplexer under the control of the clock signal.

5. The digital system of claim wherein the portion of the clock cycle time the delay device delays the forwarded clock signal is one-half clock cycle time.

6. A digital system which comprises:

a first subsystem;

a clock signal having a cycle time coupled by a clock path to the first subsystem;

a second subsystem comprising:

a plurality of latches arranged in parallel, each latch having a data input, control inputs and a data output, a multiplexer having a plurality of data inputs, each one coupled to the data output of one of the plurality of latches, control inputs, and an output, a state device having a data input coupled to the output of the multiplexer and a data output, a forwarded clock phase generator having inputs and control outputs, each one of the outputs coupled to a preselected respective one of the control inputs of the plurality of latches, and data mux select logic having inputs and control outputs, each one of the outputs coupled to a preselected respective one of the control inputs of the multiplexer, the second subsystem coupled to the clock signal providing a skewed version of the clock signal to the second subsystem;

a data path coupling the first subsystem to the second subsystem for transmitting a series of data items from the first subsystem to the second subsystem;

a forwarded clock path coupling the first subsystem to the second subsystem for transmitting a forwarded clock signal from the first subsystem to the second subsystem;

a delay device intercoupled in the forwarded clock path between the first subsystem and the second subsystem, the delay device delaying the forwarded clock signal by a portion of the clock cycle time;

the forwarded clock phase generator generating a plurality of control signals in response to the delayed forwarded clock signal;

the data mux select logic generating a plurality of selection control signals in response to the skewed version of the clock signal in the second subsystem;

the inputs of the plurality of latches coupled to the data path, the plurality of latches being sequentially enabled by the plurality of control signals from the forwarded clock phase generator to capture the series of data items in the plurality of latches;

the multiplexer sequentially selects its inputs to pass the series of data items available at the outputs of the plurality of latches to the multiplexer output under the control of the plurality of selection control signals from the data mux select logic; and the state device captures the data items from the output of the multiplexer under the control of the clock signal.

7. The digital system of claim 6 wherein the portion of the clock cycle time the delay device delays the forwarded clock signal is one-half clock cycle time.

8. A subsystem which is a component of a synchronous digital system, the subsystem comprises:

a plurality of latches arranged in parallel, each latch having a data input, control inputs and a data output;

a multiplexer having a plurality of data inputs, each one coupled to the data output of one of the plurality of latches, control inputs, and an output;

a state device having a data input coupled to the output of the multiplexer and a data output;

control logic having inputs and control outputs, each one of the outputs coupled to a preselected respective one of the control inputs of the plurality of latches and multiplexer;

a system clock signal having a cycle time coupled by a clock path to the subsystem;

a data path coupled to the subsystem for receiving a series of data items;

a forwarded clock path coupled to the subsystem for receiving a forwarded clock signal;

a delay device intercoupled in the forwarded clock path, the delay device delaying the forwarded clock signal by a portion of the clock cycle time;

the control logic generating a plurality of control signals in response to the delayed forwarded clock signal;

the inputs of the plurality of latches coupled to the data path, the plurality of latches being sequentially enabled by the plurality of control signals from the control logic to capture the series of data items in the plurality of latches;

the multiplexer sequentially selects its inputs to pass the series of data items available at the outputs of the plurality of latches to the multiplexer output under the control of the plurality of control signals from the control logic; and the state device captures the data items from the output of the multiplexer under the control of the clock signal.

9. The subsystem of claim 8 wherein the control logic comprises:

a forwarded clock phase generator having inputs and control outputs, each one of the outputs coupled to a preselected respective one of the control inputs of the plurality of latches, the forwarded clock phase generator generating a plurality of control signals in response to the delayed forwarded clock signal to sequentially enable the plurality of latches to capture the series of data items; and data mux select logic having inputs and control outputs, each one of the outputs coupled to a preselected respective one of the control inputs of the multiplexer, the data mux select logic generating a plurality of selection control signals in response to the delayed version of the clock signal to sequentially select the inputs of the multiplexer to pass the series of data items to the output of the multiplexer.

10. A method of transmitting accurately a series of data items from a source subsystem to a destination subsystem, each of the source and destination subsystems being coupled to a clock signal having a clock cycle time, comprising the steps of:

(a) transmitting the data items serially along a data path coupling the source subsystem to the destination subsystem;

(b) transmitting a forwarded clock signal along a clock path coupling the source subsystem to the destination subsystem;

(c) delaying the forwarded clock signal by a portion of the clock cycle time before the forwarded clock signal reaches the destination subsystem;

(d) sequentially enabling a plurality of latches arranged in parallel in the destination subsystem as a function of the delayed forwarded clock to capture the data items being transmitted serially along the data path from the source subsystem in an interleaved manner through a continuous rotation among the plurality of latches;

(e) sequentially passing the data items through the latches to inputs of a multiplexer as a function of the forwarded clock signal;

(f) sequentially enabling the multiplexer to pass the data items at its inputs to its outputs; and (g) capturing each one of the data items from the output of the multiplexer in a state device within two clock cycle times from when each one of the data items was transmitted from the source subsystem.

11. A method of transmitting accurately a series of data items from a source subsystem to a destination subsystem, each of the source and destination subsystems being coupled to a clock signal having a clock cycle time, comprising the steps of:

(a) initializing the source and destination subsystems to insure synchronous operation;

(b) transmitting the data items serially along a data path coupling the source subsystem to the destination subsystem;

(c) transmitting a forwarded clock signal along a clock path coupling the source subsystem to the destination subsystem;

(d) delaying the forwarded clock signal by a portion of the clock cycle time before the forwarded clock signal reaches the destination subsystem;

(e) sequentially enabling a plurality of latches arranged in parallel in the destination subsystem as a function of the delayed forwarded clock to capture the data items being transmitted serially along the data path from the source subsystem in an interleaved manner through a continuous rotation among the plurality of latches;

(f) sequentially passing the data items through the latches to inputs of a multiplexer as a function of the forwarded clock signal;

(g) sequentially enabling the multiplexer to pass the data items at its inputs to its outputs; and (h) capturing each one of the data items from the output of the multiplexer in a state device within two clock cycle times from when each one of the data items was transmitted from the source subsystem.

12. The method of any one of claims 10 or 11 wherein the portion of the clock cycle time the forwarded clock signal is delayed is one-half clock cycle time.

* * * * *